(12) United States Patent
Solomon

(10) Patent No.: US 6,404,409 B1
(45) Date of Patent: Jun. 11, 2002

(54) VISUAL SPECIAL EFFECTS DISPLAY DEVICE

(76) Inventor: Dennis J. Solomon, P.O. Box 289, Yarmouth Port, MA (US) 02675

(*) Notice: Subject to any disclaimer, the term of this patent is extended or adjusted under 35 U.S.C. 154(b) by 0 days.

(21) Appl. No.: 09/250,384

(22) Filed: Feb. 12, 1999

(51) Int. Cl.[7] .................................................. G09G 3/00
(52) U.S. Cl. ........................... 345/31; 345/31; 345/46; 345/82; 340/815.45
(58) Field of Search .............................. 345/31, 39, 40, 345/46, 82; 340/815.45, 815.53, 815.86, 815.64, 815.87, 815.88; 700/200, 213

(56) References Cited

U.S. PATENT DOCUMENTS

| | | | | |
|---|---|---|---|---|
| 4,739,128 A | * | 4/1988 | Grisham ..................... 340/709 |
| 5,057,827 A | * | 10/1991 | Nobile et al. ............... 340/716 |
| 5,357,571 A | * | 10/1994 | Barwart ....................... 380/49 |
| 5,406,300 A | * | 4/1995 | Tokimoto et al. ............. 345/31 |
| 5,444,456 A | * | 8/1995 | Ohta et al. .................... 345/39 |
| 5,670,971 A | * | 9/1997 | Tokimoto et al. ............. 345/31 |
| 5,748,157 A | * | 5/1998 | Eason ........................... 345/31 |
| 5,825,283 A | * | 10/1998 | Camhi ......................... 340/438 |
| 5,929,770 A | * | 7/1999 | Faita ............................ 235/385 |
| 6,006,159 A | * | 12/1999 | Schmier et al. .............. 701/200 |
| 6,037,876 A | * | 3/2000 | Crouch .......................... 345/31 |
| 6,239,774 B1 | * | 5/2001 | Altman ......................... 345/31 |
| 6,249,998 B1 | * | 6/2001 | NakaMats .................... 345/31 |

* cited by examiner

*Primary Examiner*—Lun-Yi Lao

(57) ABSTRACT

A visual special effects display device is presented with a control mechanism which enables the unique control and programming of one or more devices simultaneously. The display device may be incorporated into tickets at public events, promotions, toys or other applications. In one embodiment the visual elements are constructed from LEDs and controlled by a combination of a remote transmitter and local switching mechanism. The display devices may be programmed in advance and assigned a unique code which permits the programming of specific images in a large audience. Messages, images and effects may be altered or permanantly programming at any time during the event. Designs include tickets, drink coasters, wands, swords, tops, yo-yos, frisbees, batons, hats, jump ropes and other toys.

15 Claims, 23 Drawing Sheets

FIG. 19

VISUAL SPECIAL EFFECTS DISPLAY DEVICE

DESCRIPTION

1. Technical Field

Figure 1:
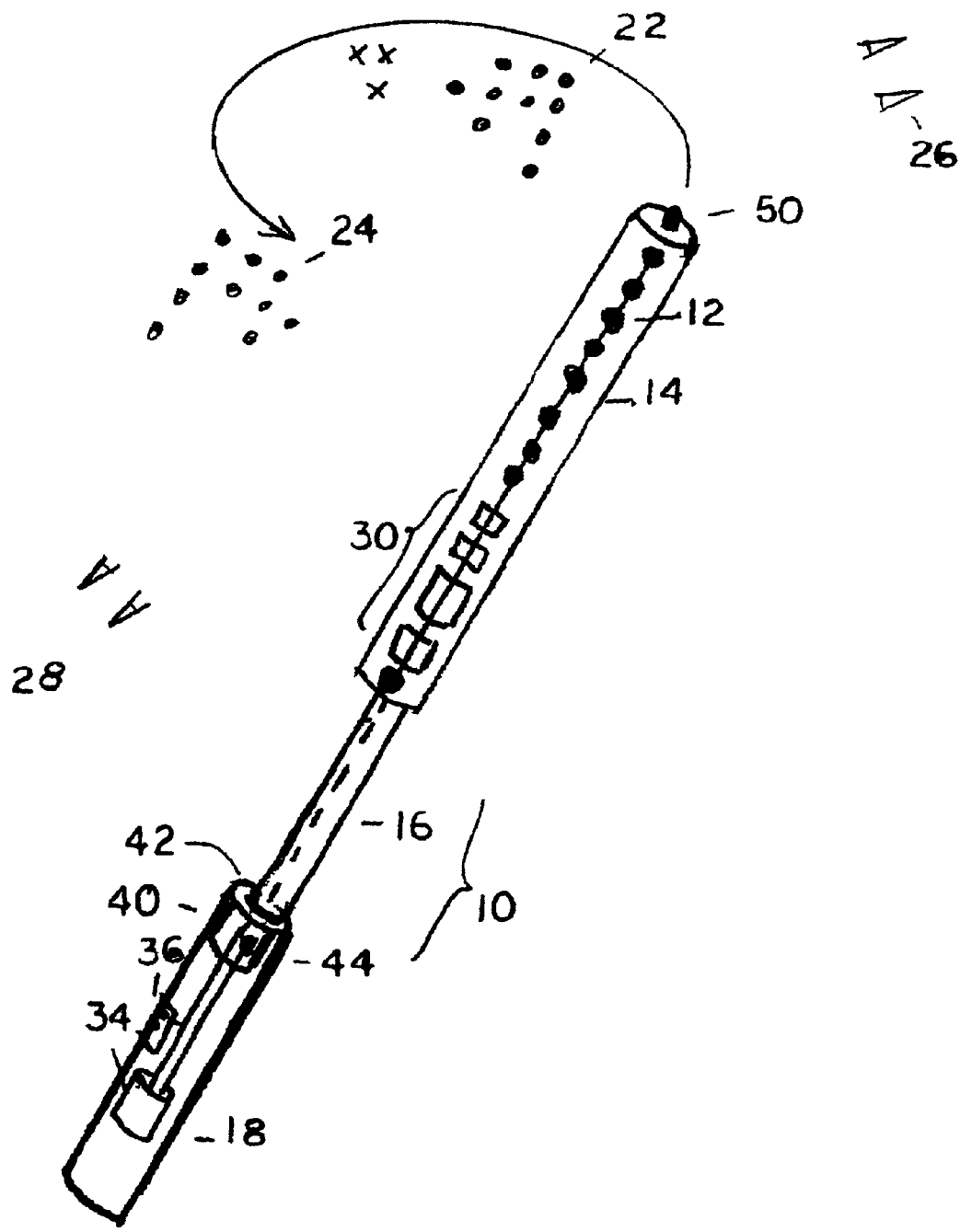

This invention relates generally to display devices and more particularly to volumetric imaging devices created by moving light emitting elements.

2. Background Art

The presentation of visual images by moving display elements has a long and expansive history. Numerous inventions have been proposed which have generally been too complicated to be reliable, expensive to manufacture, without sufficient resolution, or sufficient stability to gain wide acceptance. Following the development of light emitting diodes (LEDs), a large variety of displays, A games, wands and yo-yos have been manufactured, publicly presented and patented. These inventions strobe arrays of individual light elements or pixels as the array is displaced cyclically, producing an image or pattern due to the persistence phenomenon of human vision. Sinclair in U.S. Pat. No. 3,846,784 closes one such device. Francis Duffy in his U.S. Pat. No. 3,958,235 discloses linear wand of LEDs oscillated by a door buzzer electromagnetic actuator. He anticipated that a manual actuator may be used, and subsequent to his publication numerous manual devices were produced. Edwin Berlin in his U.S. Pat. No. 4,160,973 extended the work of Duffy to both 2 & 3 devices using "rotational" or "short-distance oscillatory motion" with extensions of Nipkow's disc television. Berlin also disclosed the use of moving digital memory and electronics and a "single pulse (per cycle) . . . which adjusts the frequency of a dock (controlling the timing of each LED)". Berlin also disclosed an infrared LED data receiver including onboard memory. Berlin built a number of devices including manually activated "spinning top" type toys. Bill Bell is his U.S. Pat. No. 4,470,044 disclosed a single stationary array of LEDs with "saccadic eye movement" timing with non-claimed references to applications including wands, tops and bicycles. The Bell invention, sold by the MIT Gift Shop in the 1980s, was widely applied to spinning objects including frisbees, vehicle wheels, fans, tops, etc. Marhan Reysman in his U.S. Pat. No. 4,552,542 discloses a spinning disc toy with a centrifugal switch causing a light to be illuminated. It follows a line of inventions related to tops and yo-yos. Hiner is his U.S. Pat. No. 4,080,753 discloses a toy flying saucer with a centrifugal motion sensor.

This inventor, in his U.S. Pat. No. 4,983,031 discloses a method of data display control and method for the proper display of images to all observers in both directions for projection and LED moving displays. Numerous related hand-activated toys or educational devices incorporating centrifugal on/off switches and the IR communication method of Berlin were built and publicly displayed at the Museum of Science, the Children's Museum in Boston and the Exploratorium in San Francisco.

Recently, the techniques of Duffy, Berlin, Bell and Solomon were applied to handheld wands differentiated from the prior art by the specific detailed centrifugal switch designs. Tokimoto is his U.S. Pat. No. 5,406,300 discloses a display wand with a hall effect acceleration sensor. Sako in his U.S. Pat. No. 5,444,456 uses an inertial sensor having "a pair of fixed contacts and a moveable contact" to adjust the clock of the display electronics. While inventive and functional, the Sako design remains awkward and requires considerable energy to maintain an image. For these reasons, it is unsuitable for entertainment, marketing and game applications. U.S. Pat. No. 5,791,966 appears to restate the teaching of Bell, Berlin, and Hiner patents in a mechanical top—a combination which has publicly constructed in the 1980s—with the addition of a combination incorporating a bar code reader for reprogramming. This narrow improvement using a bar code reader has considerable utility for low cost games and novelty items. Like the Tokimoto and Sako patents, the Capps patent demonstrates the importance of precise and limited element improvements to a crowded art.

A number of problem have remained including the development of switching methodology which permits a static on-off state, display freedom from inertial changes and a frame of reference to global orientation. None of the more recent wand patents would work properly if the wand were twirled in the air as a nightstick or a baton, or the revolution direction reversed.

SUMMARY OF THE INVENTION

The present invention discloses an improved method of creating a visual display with moving elements including an improved switching technology of greater utility, lower cost and increase performance.

Another object of the invention is an improved switching method with includes a frame of reference to global orientation.

Another object of the invention is an improved switching method with includes a direction of revolution frame of reference.

Another object of the invention is a reduction in the energy required to sustain a image.

Another object of this invention to provide a game method which enhances hand-eye coordination and other skills A further object is the application of the method of the present invention to entertainment devices and games.

Figure 2:
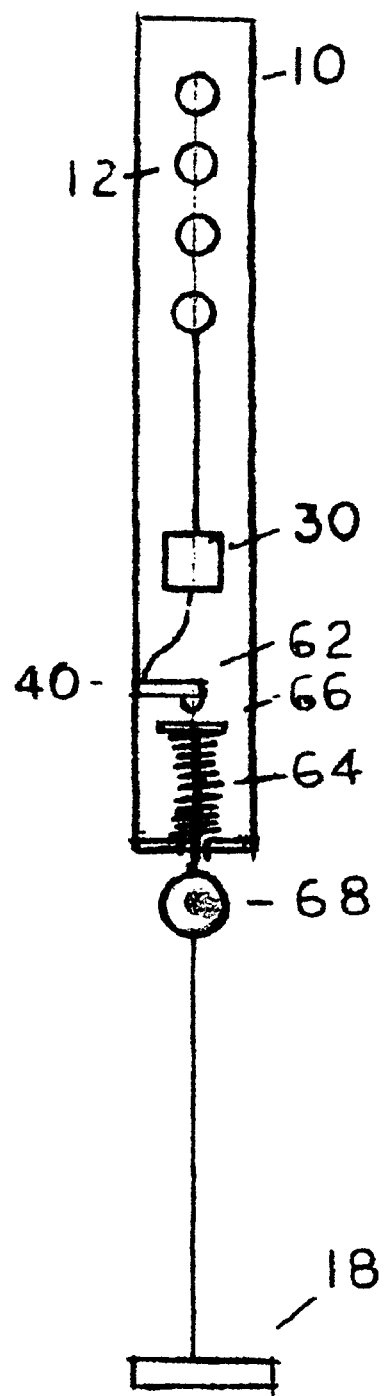
Figure 3:
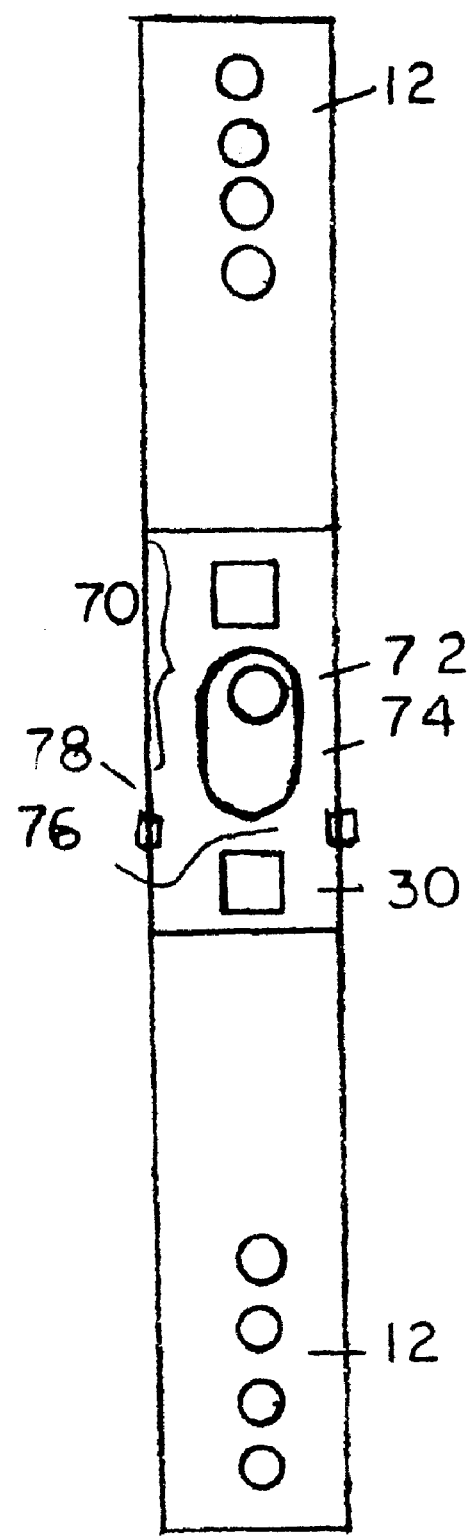
Figure 4:
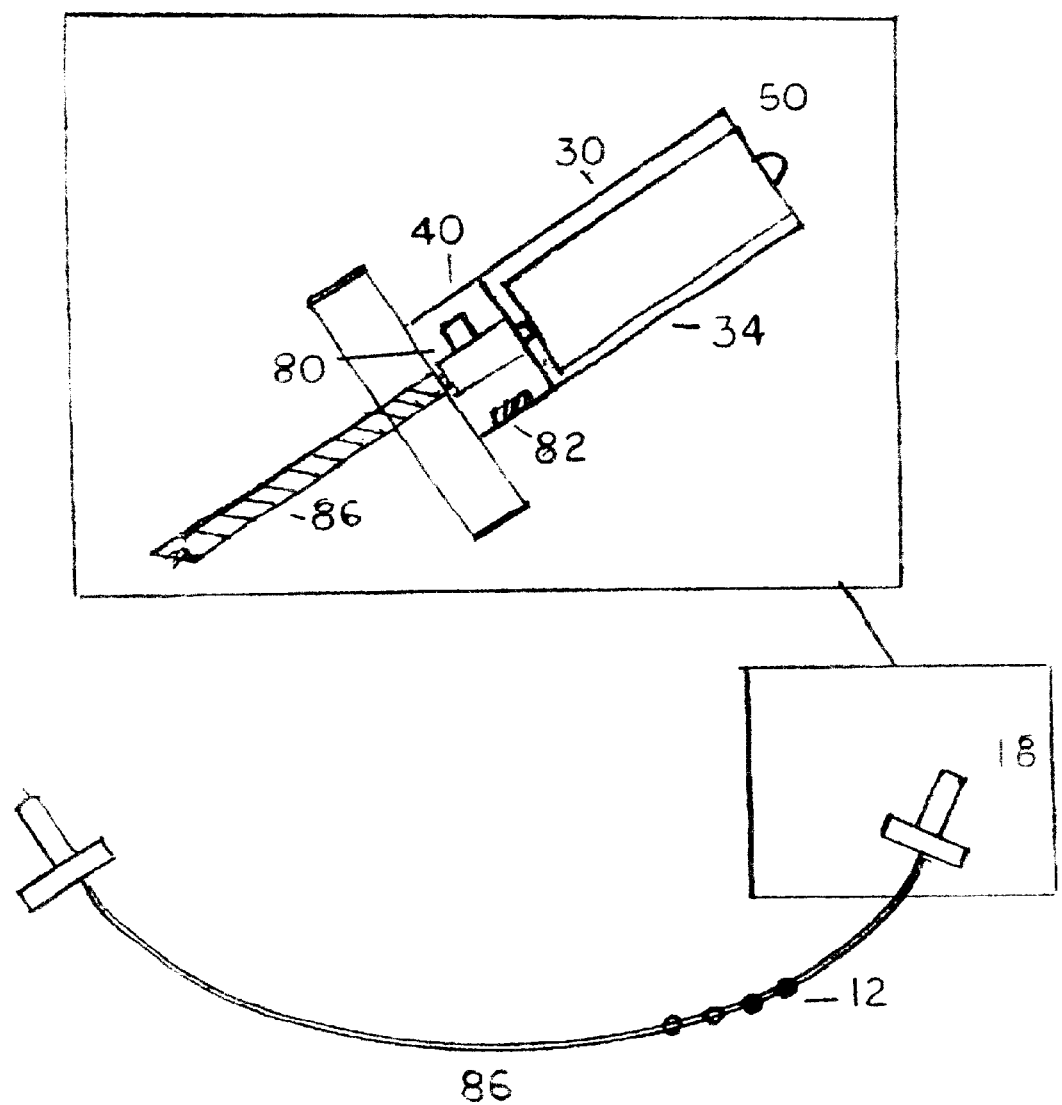
Figure 5:
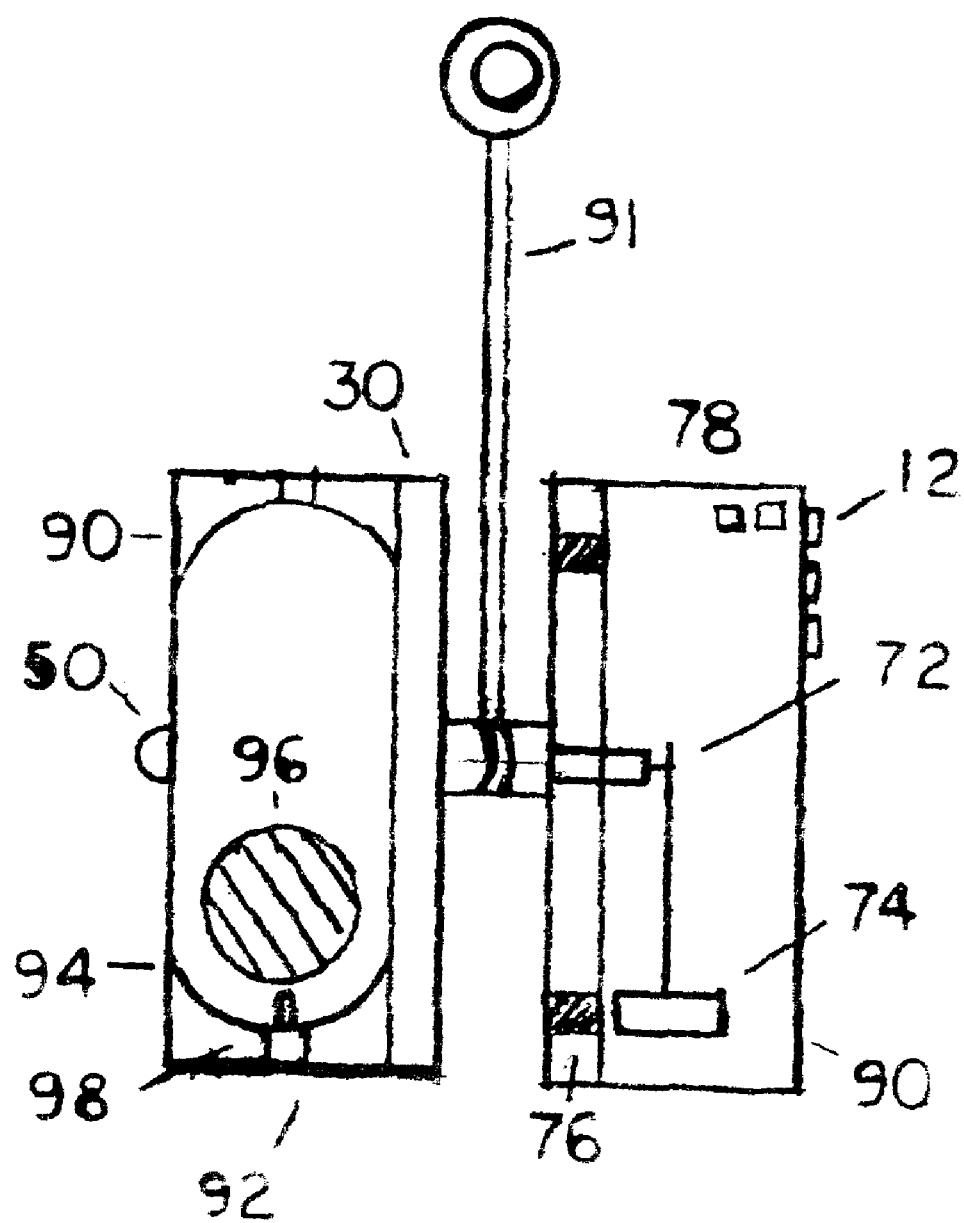
Figure 6:
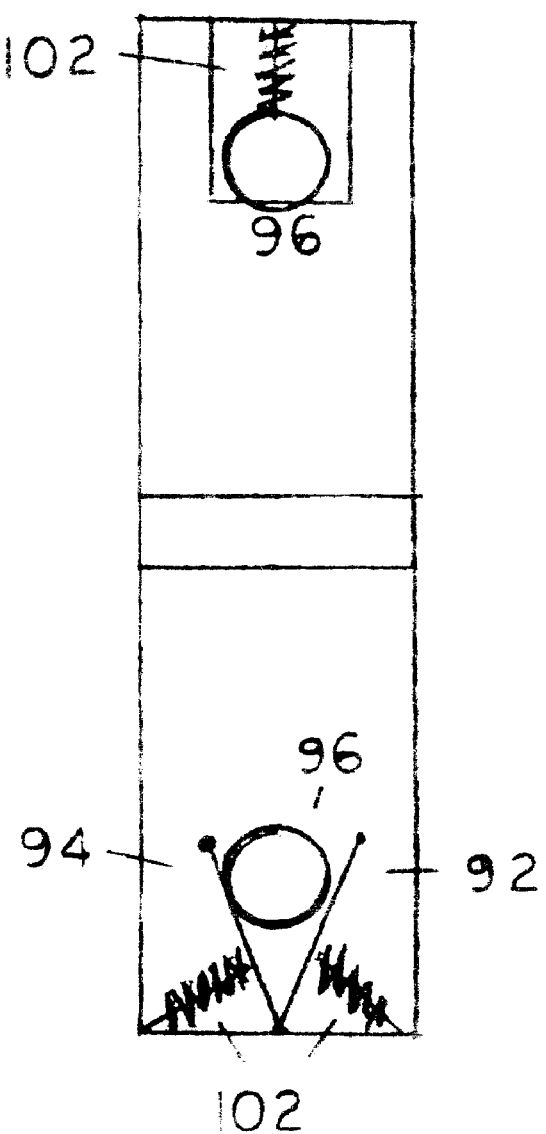
Figure 7:
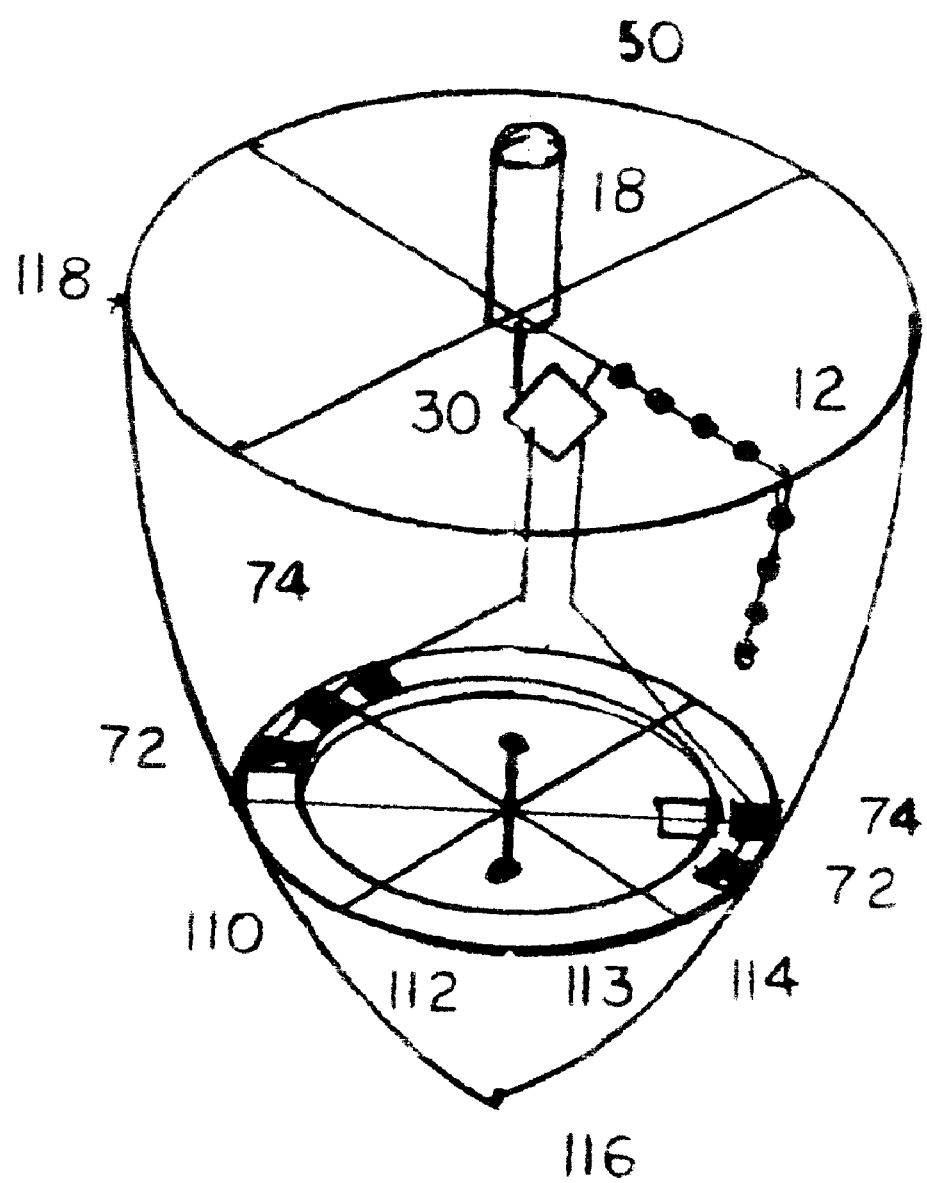
Figure 8:
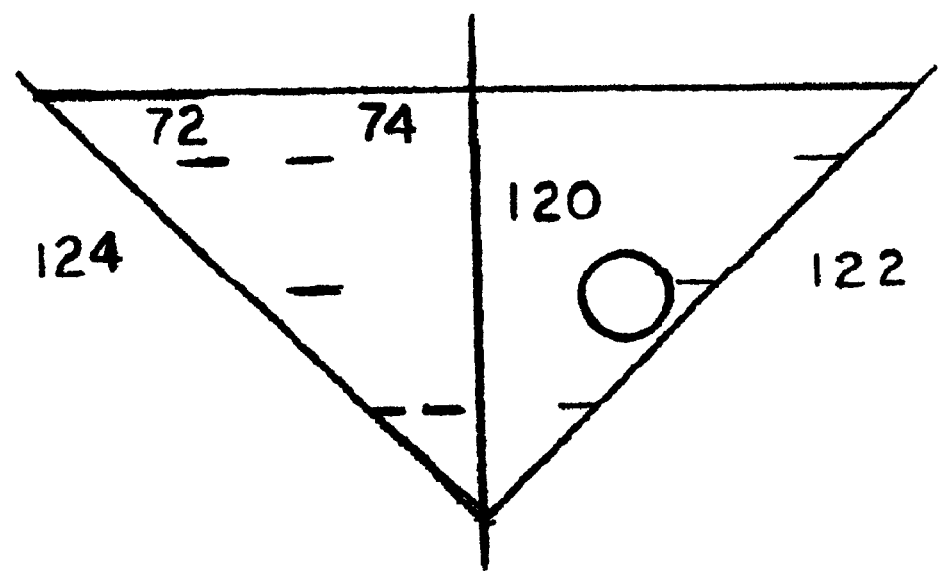
Figure 10:
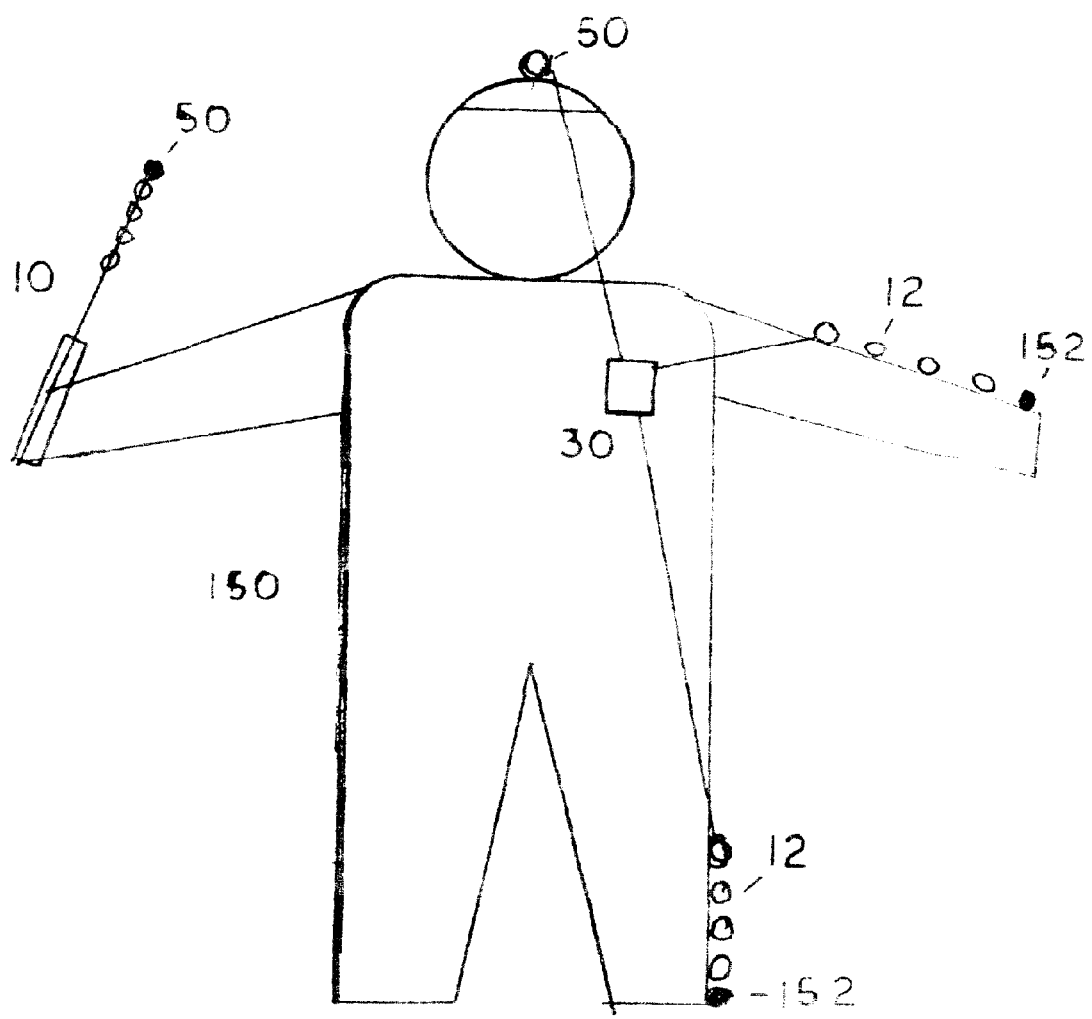
Figure 11:
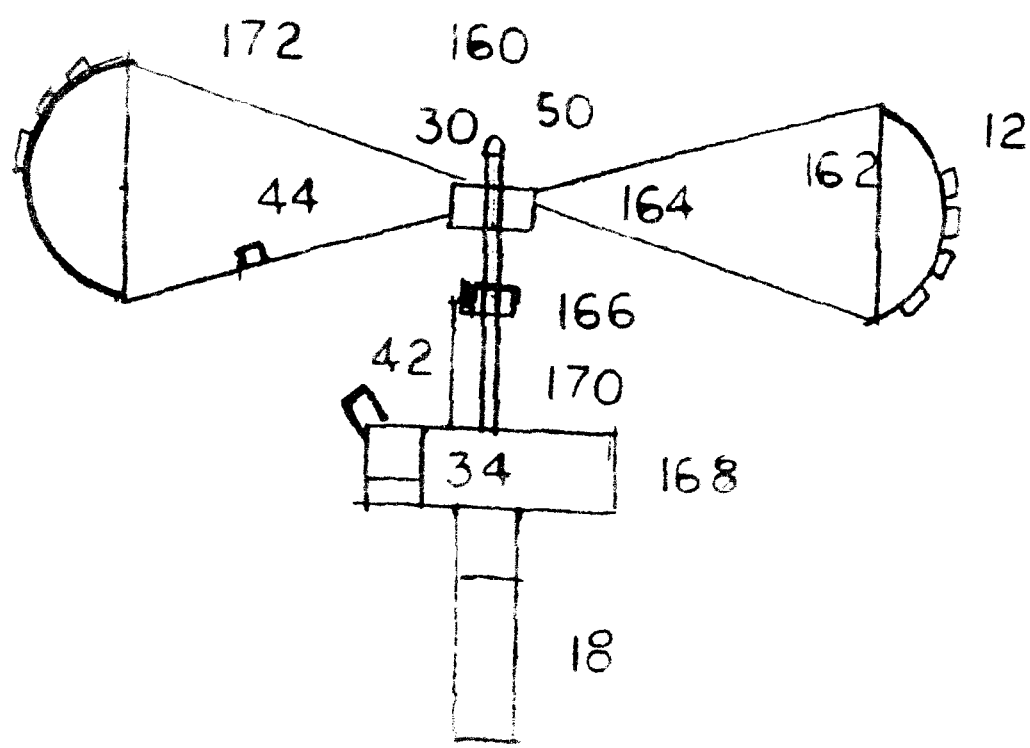
Figure 12:
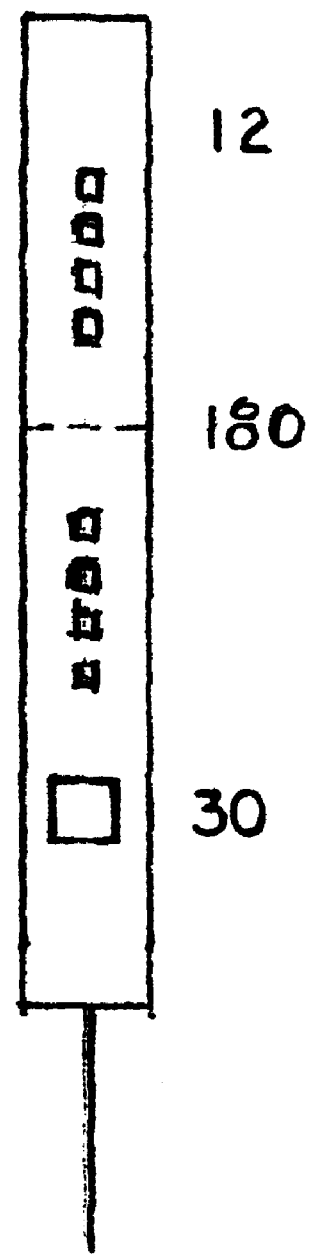
Figure 13:
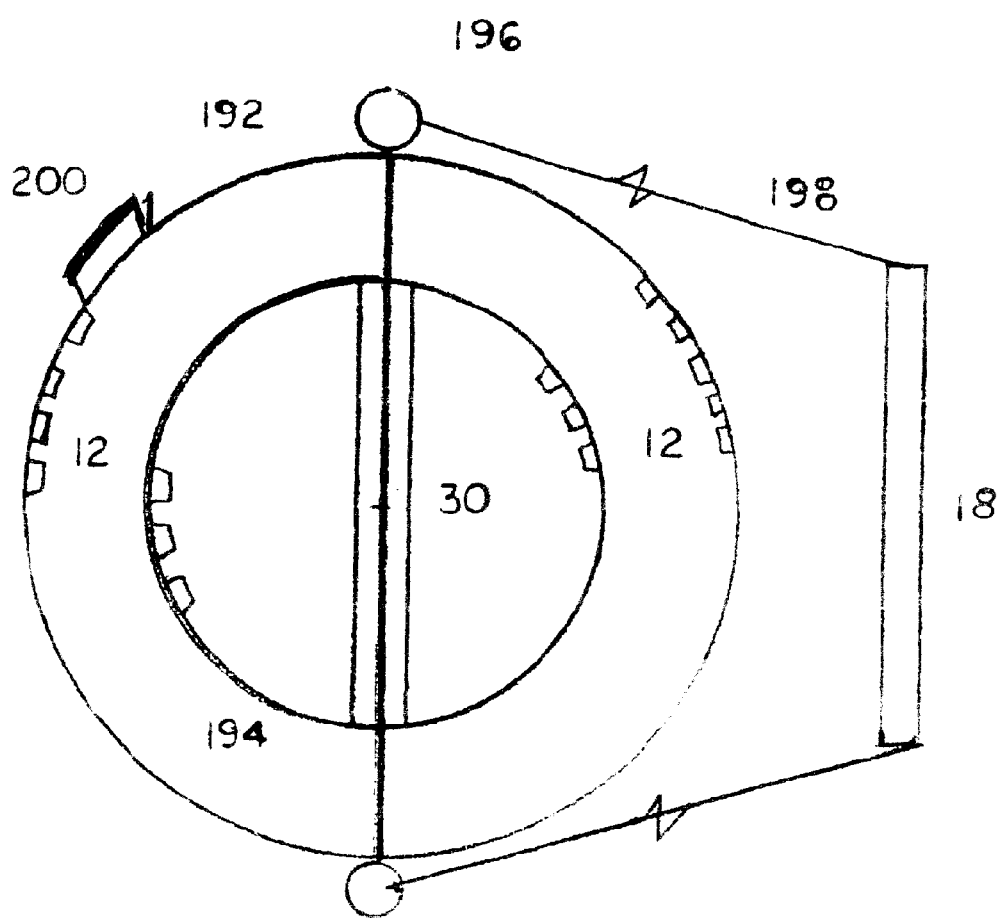
Figure 14:
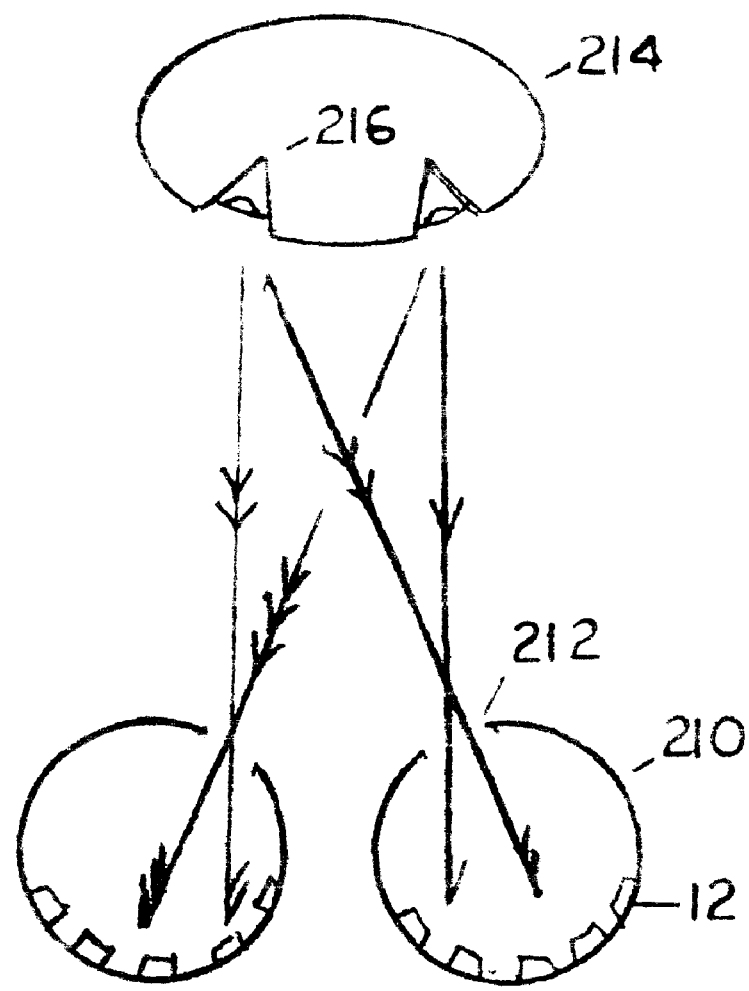
Figure 15:
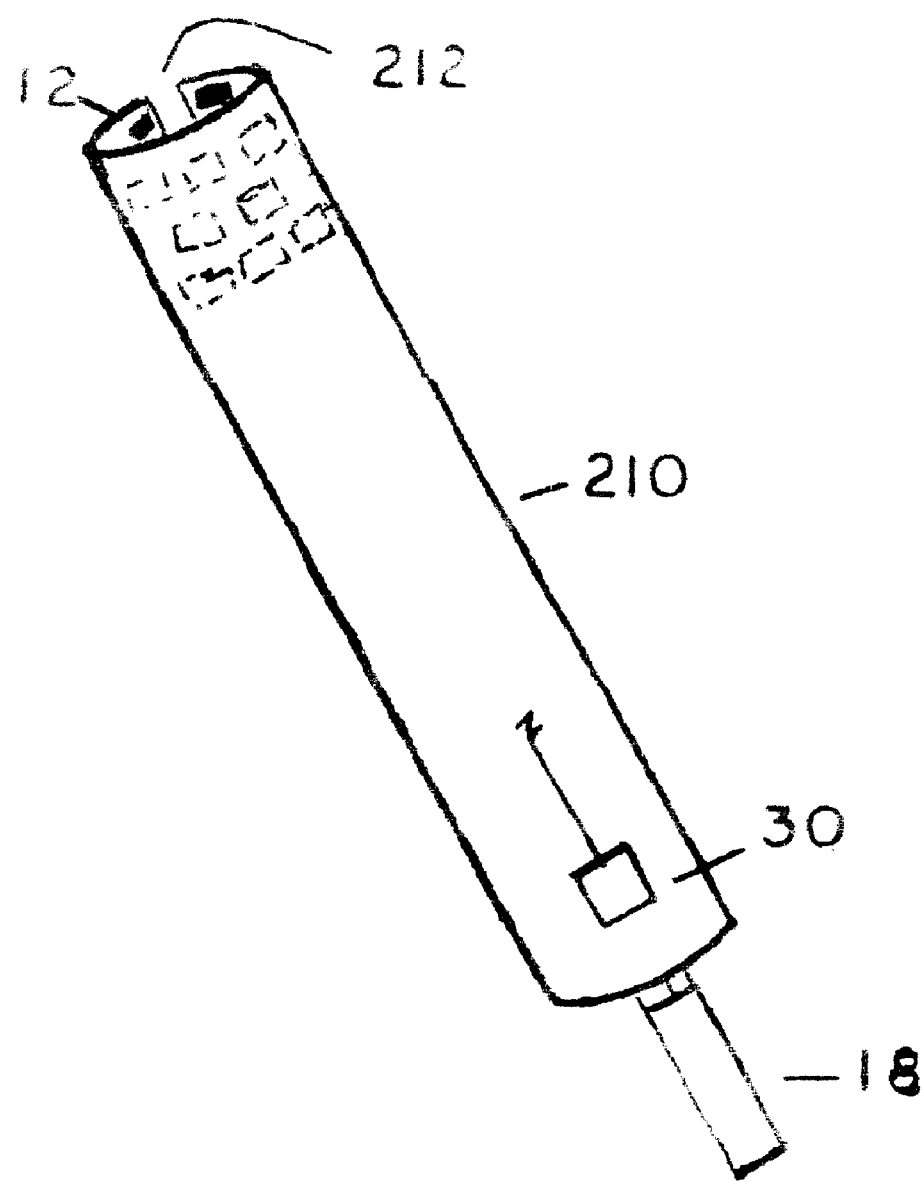
Figure 16:
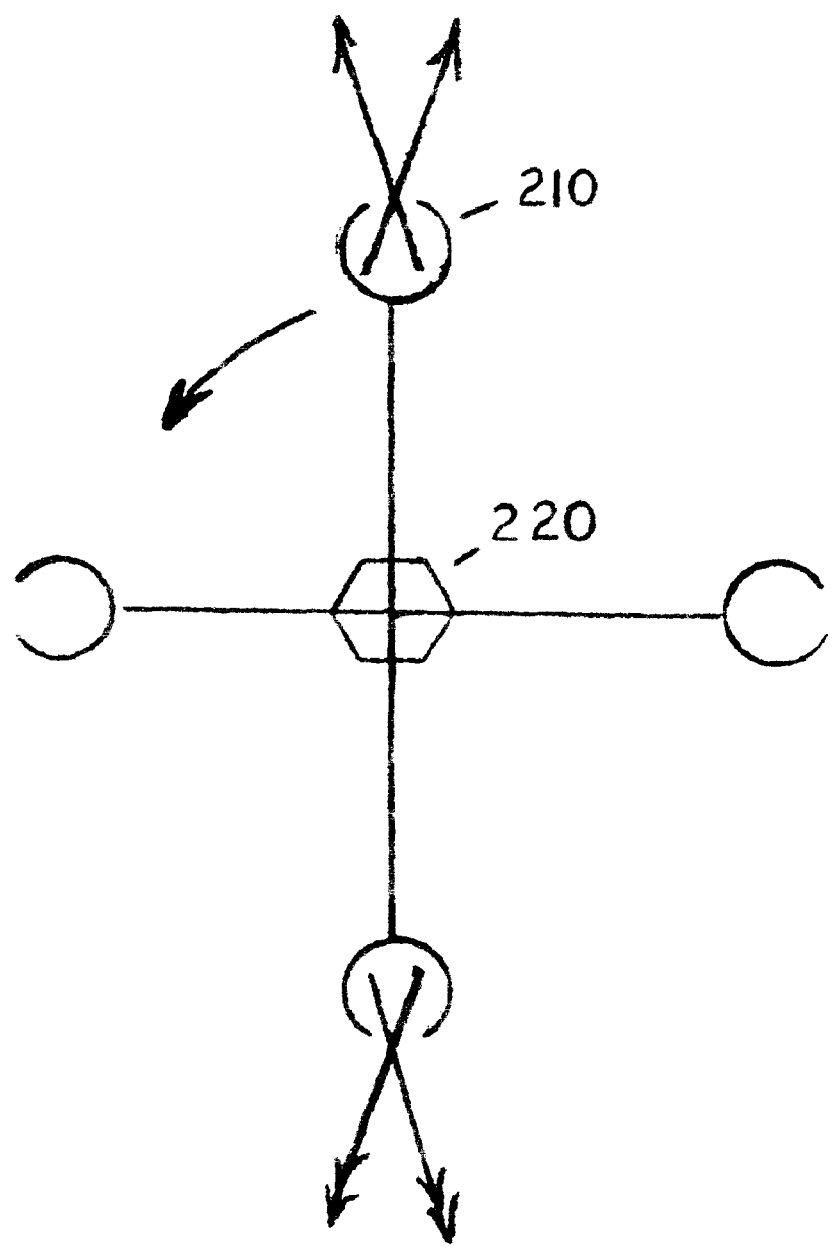
Figure 17:
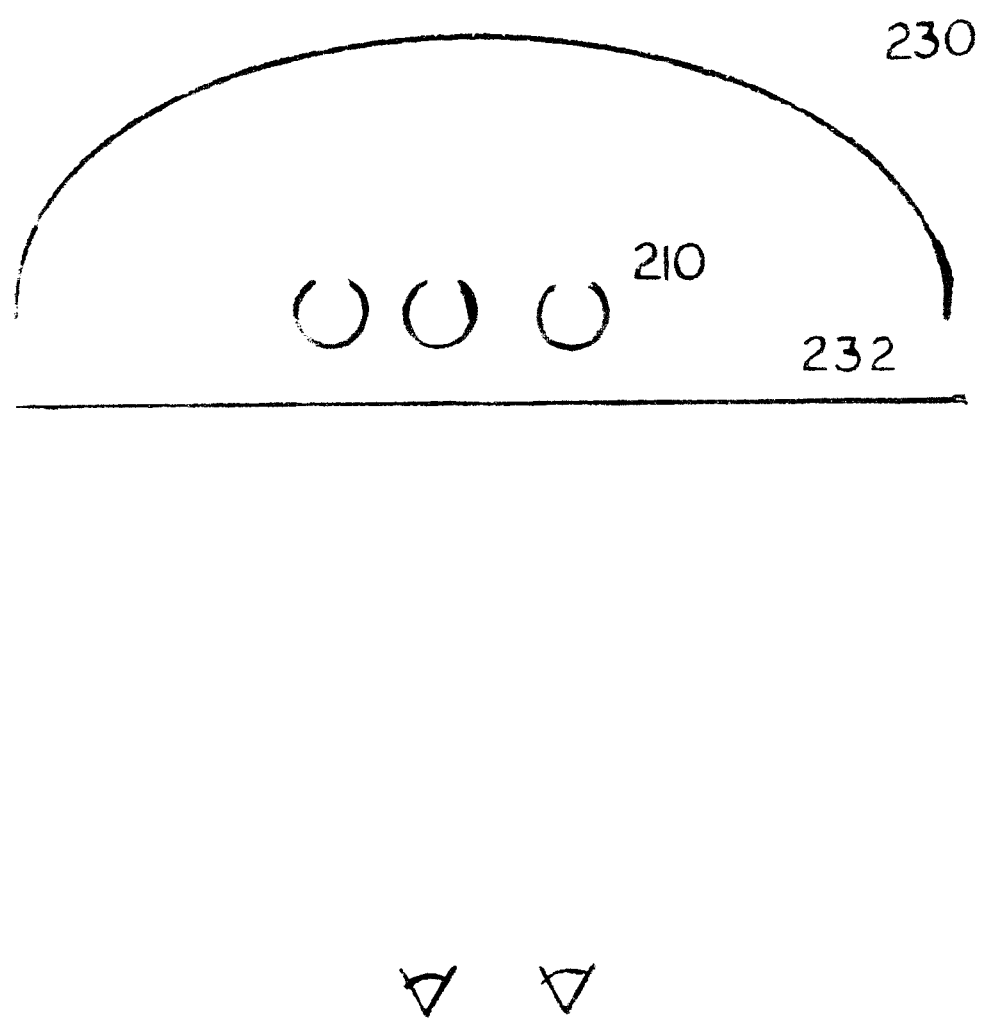
Figure 18:
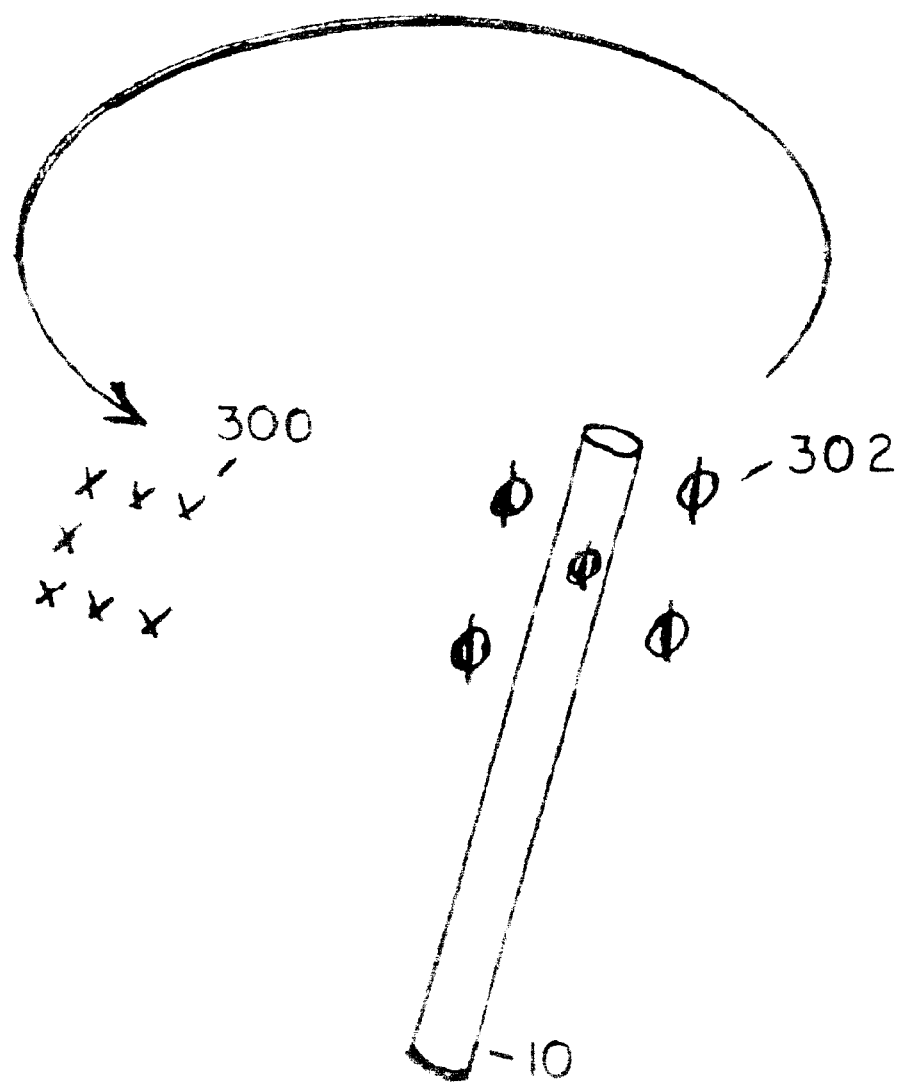
Figure 20:
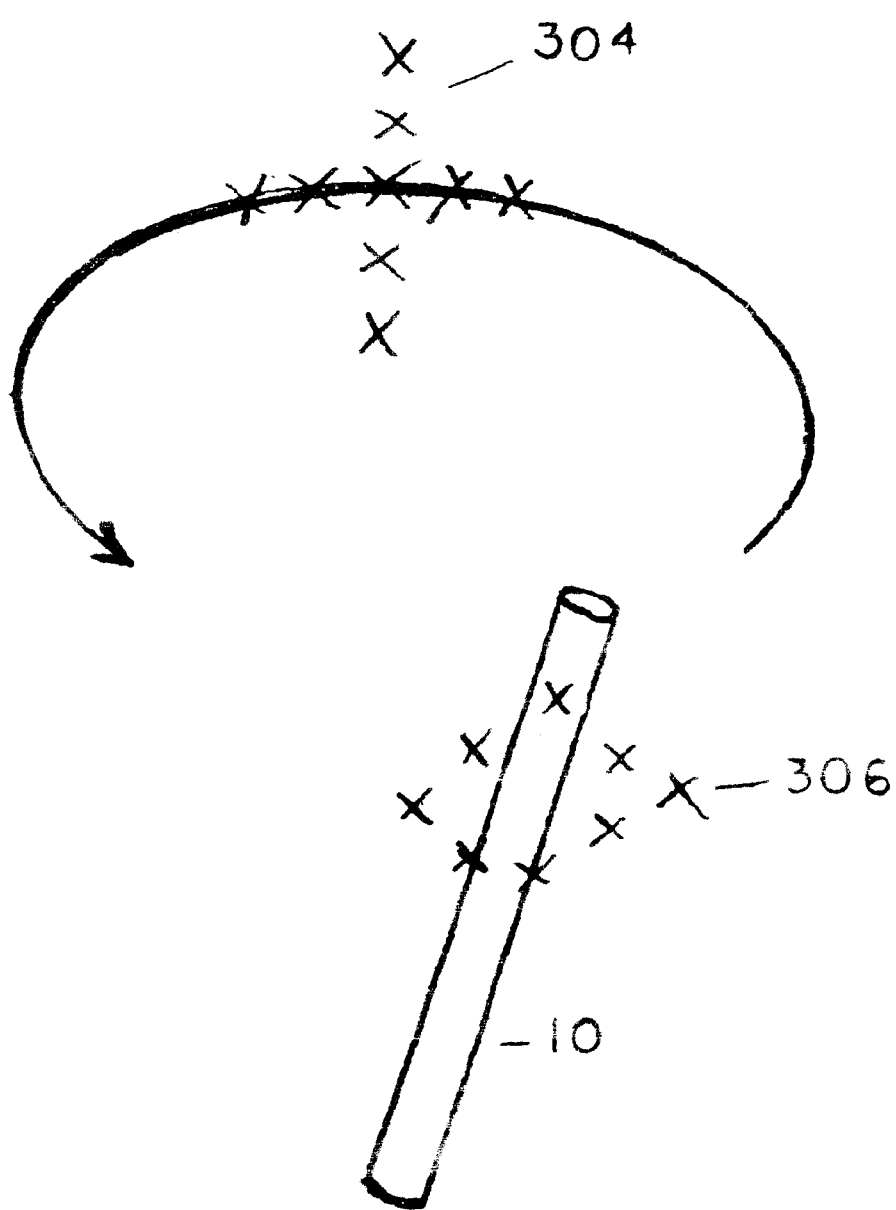
Figure 21:
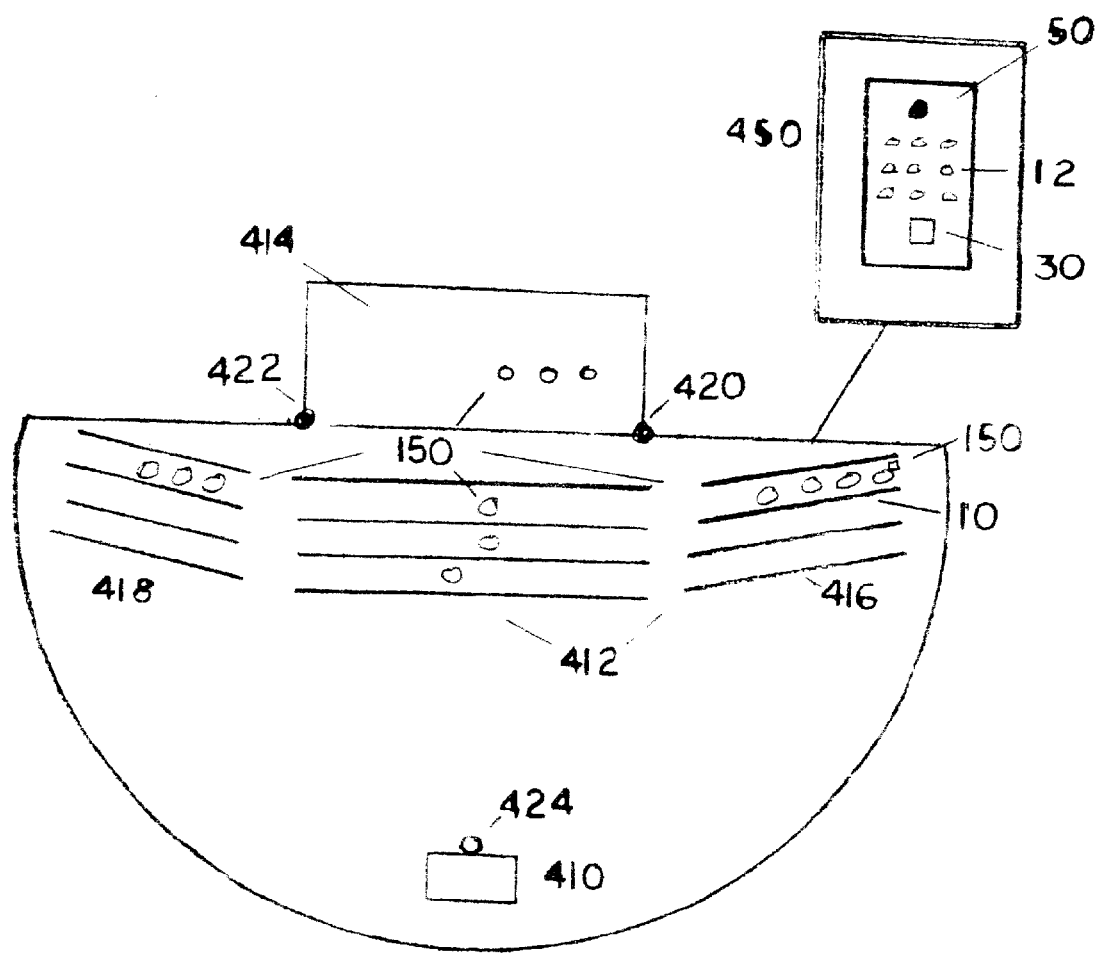
Figure 22:
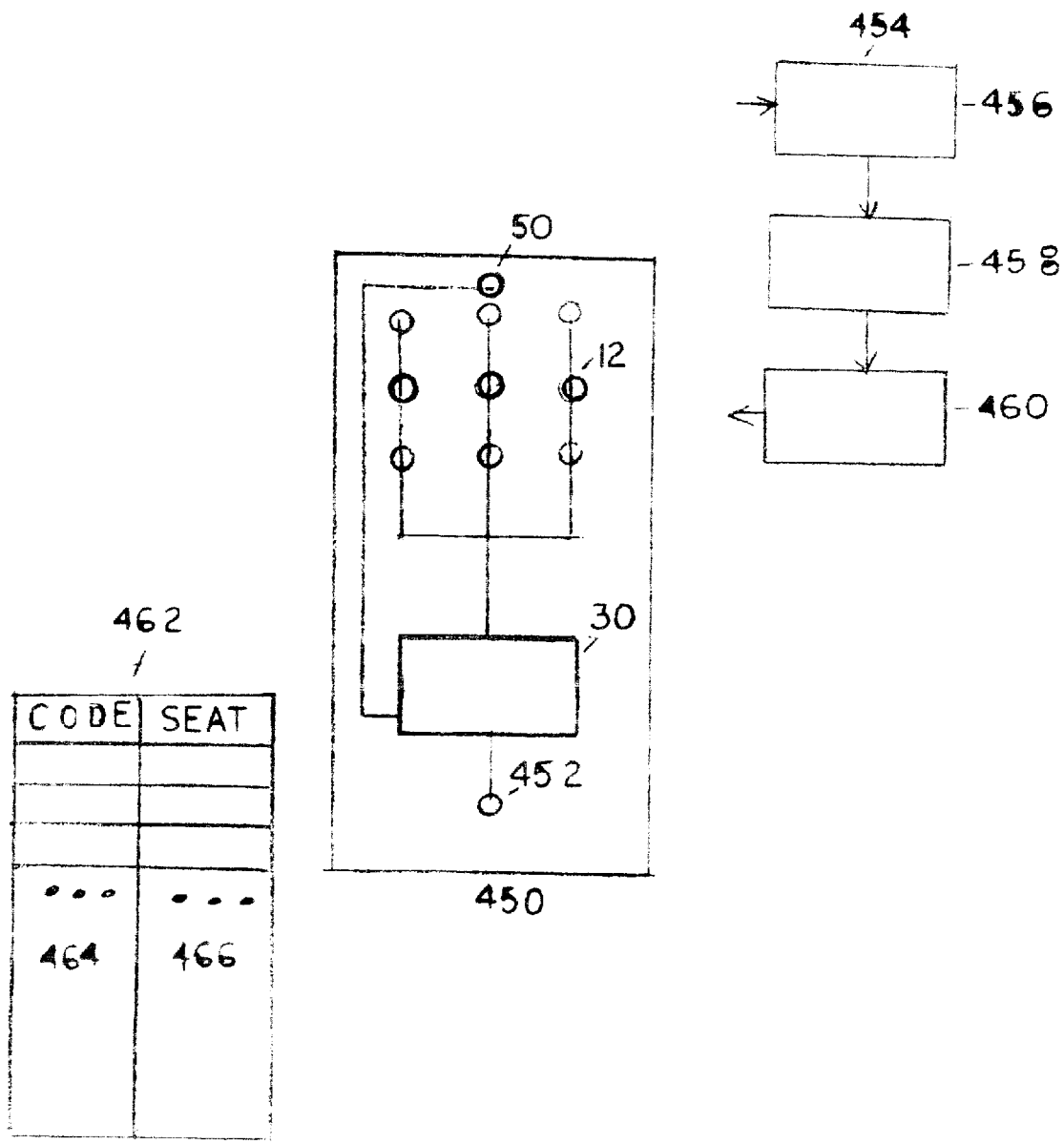

Another object is the application of the method to artistic presentations,

The above and still further objects, features and advantages of the present invention will become apparent upon consideration of the following detailed disclosure of specific embodiments of the invention, especially when taken in conjunction with the accompanying drawings, wherein:

FIG. 1 shows a perspective view of the general wand embodiment of the present invention, FIG. 2 shows a cross sectional view of the radial swing embodiment of the present invention, FIG. 3 shows a cross sectional view of the baton embodiment of present invention, FIG. 4 shows a cross sectional view of the jump rope embodiment of present invention, FIG. 5 shows a cross sectional view of the yoyo embodiment of present invention, FIG. 6 shows a cross sectional view of the further mechanism of the yoyo embodiment of present invention, FIG. 7 shows a cross sectional view of the top embodiment of the present invention, FIG. 8 shows a cross sectional view of the detailed of a top embodiment of the present invention, FIG. 10 shows a perspective view of an interactive, remote programmed embodiment of the present invention, FIG. 11 shows a cross sectional functional view of a pin-wheel embodiment of the present invention, FIG. 12 shows a cross sectional functional view of a construction of the present invention, FIG. 13 shows a cross sectional view of a multiple ring embodiment of the present invention, FIG. 14 shows a top view of an autostereoscopic embodiment of the present invention, FIG. 15 shows a perspective view of an autostereoscopic embodiment of the present invention, FIG. 16 shows a top view of a rotating autostereoscopic embodiment such as a pin wheel, drum, or bicycle, FIG. 17 shows a perspective visual pattern view of the game embodiment of the present invention, FIG. 18 shows another visual pattern view of the game embodiment of the present invention, FIG. 19 shows front view of displayed patterns of the game embodiment of the present invention FIG. 20 shows another visual pattern view of the game embodiment of the present invention, FIG. 21 shows an top stage and audience embodiment of the present invention, FIG. 22 shows a front view of the ticket embodiment of the present invention.

Figure 23:
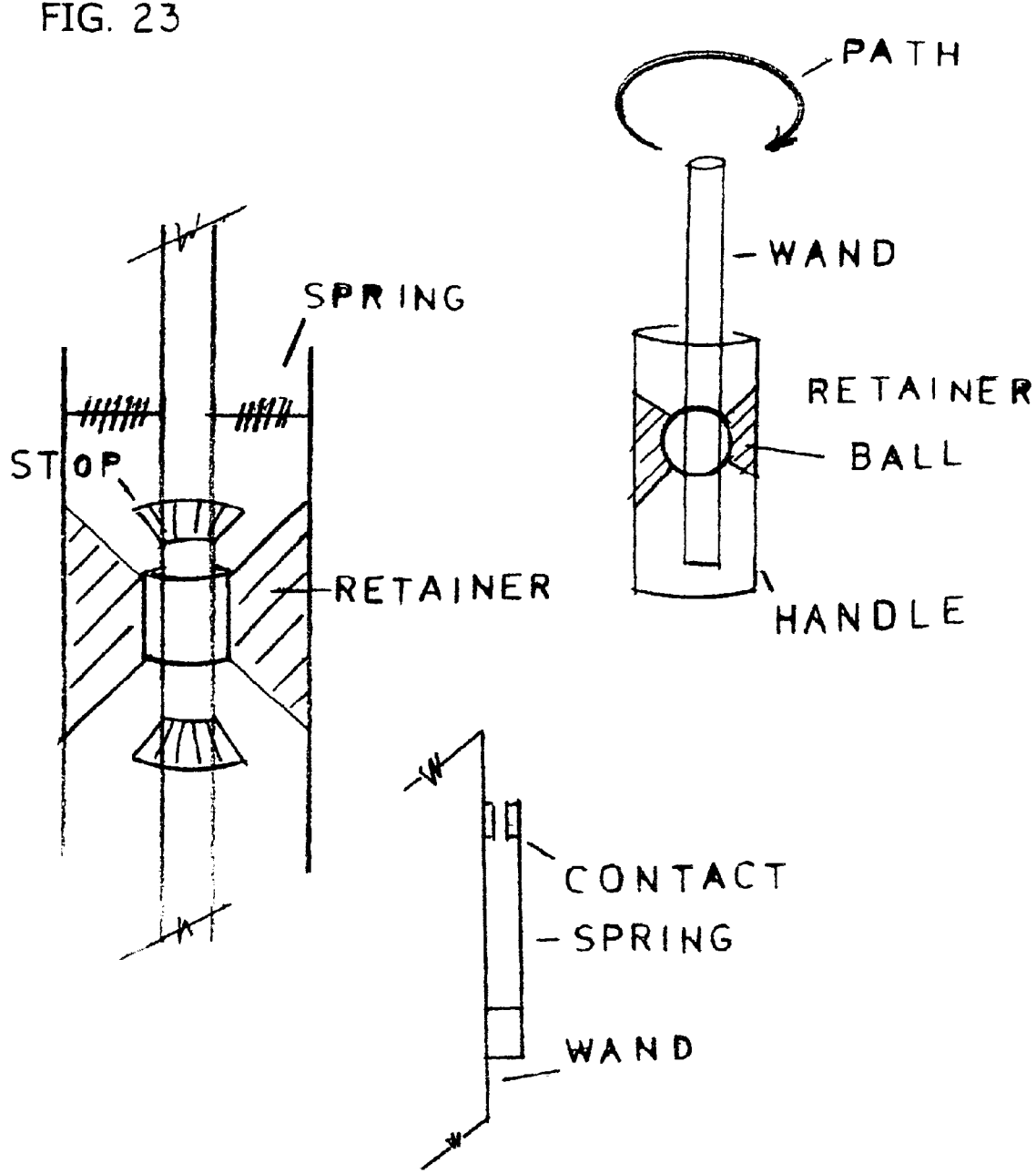

FIG. 23 shows a perspective view of construction of the handle, wand and contact embodiment of the present invention.

DETAILED DESCRIPTION OF THE INVENTION

The present invention improves the utility, cost of manufacture, performance and functionality of displacement emitter and volumetric technology by inventing a velocity-based timer interval display algorithm and a direction-based image algorithm method and developing a enabling device.

FIG. 1 shows a perspective view of the wand embodiment of the present invention. Referring to the diagram, the wand apparatus 10 supports one or more arrays of LEDs 12, 14, which may mounted or attached to a middle member 16 which may be of a flexible or articulated material. The middle member 16 may be a tube or other shape, constructed from an elastic nylon or other material. A handle 18 is attached to the flexible member 16.

The LED arrays 12, 14 are driven by image computer 30 which is constructed from components generally found in related devices are a computational unit 32 such as a microprocessor, a memory unit such as EEPROM 34, a power source 34 such as a battery, solar cell, etc., an on/off switch.

An optical infrared, electromagnetic, radio frequency, acoustic or other known data link 50 may be employed to program or communicate between the wand 10 and a base unit not shown. Common protocols may be used.

In operation, the wand 10 is cyclically displaced in a revolution 20, which may vary irregularly in shape from approximately linear to circular, During the dis placement LED array 12 is driven by the image computer 30 and creates a virtual image 22 by instantaneous changes in the intensity of each LED. The LEDs 12, 14 may be arranged in distinct and complex patterns on the wand 10 including that where output 22 of LED array 12 is directed generally towards observer 26 and the output 24 of LED array 14 is directed generally towards observer 28.

A direction and position switch 40 identifies the direction of motion and the cycle period. Many switch embodiments are envisioned and discussed further. In one illustrative preferred embodiment of the switch 40, one or more conductive regions 42 is affixed or integrated in the middle member 16 and connected to one or more inputs of the image computer 30. One or more conductive regions 44 are affixed to the handle 18 and to the image computer 30, in such a manner that the deflection of the middle member 16 causes the conductive regions 42 and 44 to be displaced relatively and thereby transmit a differential signal to the image computer 30. It should be understand that the signal transmit to the image computer may include a power on/off signal.

By measuring the differential input signal which may be voltage or current controlled, a relative measure of position and direction may be calculated. This information is then used to compute the proper spacing and initiation of the image display.

Many types of switch mechanisms may be employed. Examples include spring contacts, one or more magnets affixed to the handle 10, with Hall type sensors or reed switches are attached to the middle member 16, or optical encoders. The opposite orientation may also be used, where a single magnet is attached to the middle member 16. Other alternative switch element uses a strain gauge type material to provide a differential signal. The middle member 16 may be constructed of a solid string or braided cord.

An integrated or separate circuit and switch 40 may provide an absolute position reference in the manner taught in the Berlin patent.

It should be noted that any known or new light emitting element with sufficient switching speeds and brightness may be substituted for the LEDs in arrays 12, 14. The switch 40 may include additional parallel or integrated motion or orientation devices such as an accelerometer, gravity direction indicator, inertial gyroscope, velocity meter, timer, photocell and other known environmental and motion monitors, which contribute to the control of information to the image computer 30. In operation, when the invention is in motion, the switch 40 would provide these additional signals to the image computer 30.

One or more external switches or ports 36 may be provided to permit the activation, programming, or control by physical contact such as well known push button programming found on watches, and similar devices where the display scrolls through options, or electronic contact to a computer serial port. This external switch may be applied to all of the embodiments of the present invention.

FIG. 2 shows a simplified switch of the present invention for swing wands held by hand or a string where the switch elements include a device for measuring the force applied to the wand, which may include a mechanical switch comprised of one or more contacts 62 connected to the computer 30, a trigger contact 66 shown as a plunger pressed against computer contacts 62, a spring 64 which applies a pressing force, an attachment point 68 which when pulled in the direction of string handle 18 causes the trigger contact 66 to change state. An alternative embodiment may use a Hall effect, magnetic reed or optical switch proximal to the plunger in a digital threshold mode and in a measurement mode a fixed a strain gauge material. Other known methods of measuring the force applied to the wand 10 by the string handle 18 may be used.

FIG. 3 presents a preferred implementation as a entertainment wand 10 such a baton (a center symmetrical wand) may be configured where the LEDs 12, image computer 30, and switch 70 containing an accelerometer, an orientation/position device, and a velocity meter are incorporated. A preferred simple embodiment of the switch design 70 for a global orientation includes a pivot point 72, a offset mass 74, and one or more sensors 76, 78. In operation, the offset mass 74 pivots about pivot point 72 as the wand 10 is displaced relative to the earth's frame of reference under certain displacements, causes sensors 76, 78 to be triggers. The combination of environmental, orientation, and motion signals are used to control the text or image, direction, period and intensity of the display. In cyclical reversing operation, the start, stop and maximum times are stored and used to adjust the period of the image timing to a display a predetermined message, such as a whole word, phrase, etc., during a single cycle. Each change or stop may be used to change the message to the next word/image. In cyclical circular operation the maximum acceleration or velocity may be used as a timing period reference causing the message to be displayed within one period or a predetermined part thereof FIG. 4 shows a cross-sectional view of a jump rope embodiment of the present invention. The handle 18 of the jump rope may contain the power supply 34, the image computer 30 driving LEDs 12 attached to the moving rope 86. The switch 40 may be placed at the junction between the handle 18 and the rope 86. It may be of any of the embodiments discussed herein including an embodiment with a central rotating magnet or cam 80 and one or more sensors 82 connected to the image computer 30. Both incremental position methods where the rope 86 or its attachment turns in relation to the handle 18 thereby incrementing the position register or period position monitoring may be employed. Gravitational sensors may be used to adjust the display of the image.

FIG. 5 shows an preferred embodiment of the present invention applied to yo-yo type devices where the yoyo disk 90 support a freely pivoted mass 74 about a low friction pivot 72 such that as the yoyo spins, the mass 74 maintains a generally fixed geocentric orientation and causes sensors 76, 78 affixed to the spinning disks 90 to send a position and direction trigger signal to the image computer 30 controlling the LED array 12. The classic string 91 of a Yo-yo is shown. An optical (reflective or interrupter), mechanical, magnetic or other switch may be used. The same inventive combination may be applied to balls, batons, Frisbees, wands and other freely rotating or rolling devices. The mass may in form of a uniform or eccentric disk with upper and lower axial bearing, thereby functioning as a geocentric reference to the spinning device.

Another embodiment of a gravitational switch is shown on the left disk 90 using a rolling ball 96 in a cavity bounded by one or more sensor elements 92, 94. The sensor elements may be activated by the ball 96 closing a circuit, Hall effect proximity, optical interrupt, differential signal, etc. Alternatively, an optical, conductive, or mass liquid with corresponding sensors may be used with a similar effect A gyroscope, mechanical, electronic or optical may also be placed therein, floating in the switch cavity or with external frame attachments. A force activiated switch 98 or sensor may be included as a spin indicator.

FIG. 6 shows a velocity sensor using a measuring element 102 such as a strain gauge, incremental switch, optical position sensor or other known device for measuring the force applied by ball 96 on the containing supports 92,94. As the velocity of the yoyo, top, wand or other embodiment of the present invention increases, a corresponding variable signal is sent to the image computer 30 which responds by appropriately varying the image display rate.

FIG. 7 shows a simplified geocentric switch of the present invention applied to tops, frisbee and similar rotating devices where a centrally located, geostationary mass 110 provides a reference signal to the computer 30. In operation, the mass 110 serves as a relatively stable spatial reference point for one or more sensors 72, 74 to provide positional and direction signals to image computer 30. The image displayed by LED array 12 will maintain a stable spatial radial reference permitting visual image reinforcement, timing and direction ajustments.

On method that may be applied to the sensor signals 72, 74 placed close to each, is to record the sequence of sensor activation, measure the time difference between three signals (72,74,72 for example), compute the intrasensor difference and compare. If the time difference between 72 to 74 is shorter than 74 to 72, the n the direction of rotation of the top is clockwise from the top and the angular velocity is arc distance between 72 and 74 over the time difference. These computation may then be used to adjust the image display rates, if a sequence of signals is not received within a defined interval then the image computer may enter a sleep state.

The construction of the stable mass 110 may vary. In one preferred embodiment the mass 110 is suspended on as 112 an d bearings 113. The sensors 72, 74 interaction may be a magnet 114 and Hall effect or magnetic activated switches. Alternatively, the sensors may be mechanically switches, field effect coils, optical encoder tpe interactions, or other known sensor device. An infrared or radio link 50 may be included to permit continuing programming.

FIG. 8 shows another preferred embodiment using a solid 120 or liquid 122 in a conical chamber 124 to trigger sensors 72, 74. As the angular velocity increases, the movable trigger liquid 120, 122 in forced from a resting position making contact with the trigger sensors 72, 74.

Figure 9:
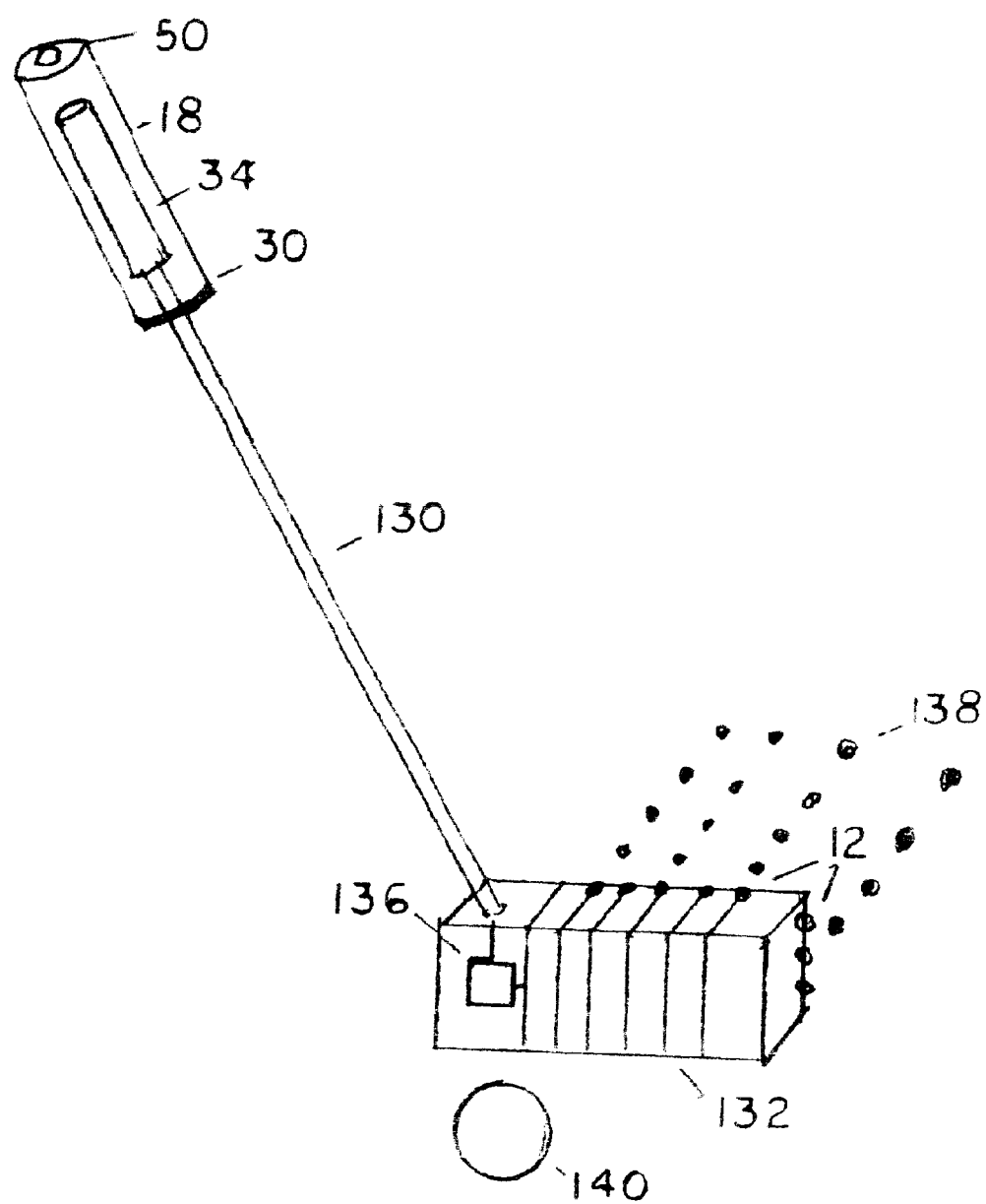

FIG. 9 shows a "golf club" embodiment of the present invention where the golf club 130 includes a piezoelectric or other impact sensitive matrix 132 connected to communication 50, computational units, centrifugal switch, motion sensor and power supply which activate and control light emitting elements 12. In operation, the light elements 12 which may include one or more colors are switched on by centrifugal switch 136 producing a regular timed pattern where the distance between successive images 138 reflects the velocity of the swing. On impact with the ball 140, a different color is displayed indicating the position of the impact on the matrix 138. The light elements 12 may be arranged in an X-Y line, visible to the player or instructor. Other patterns may be used. The computational unit 30 records the impact matrix, velocity and other information. Corrective patterns may be displayed based on the information recorded. The equal timing will show the velocity, angle of the head and path to the player/instructor. One corrective pattern would vary the timing based on the "correct" velocity providing a visual clue for the player to increase the force at a certain point. Other patterns may be employed.

FIG. 10 shows another preferred embodiment of the present invention where the LED array 12 is affixed to the arms of the person 150 and controlled by motion sensors 152 affixed to the hands interconnected to the computational unit 30. A similar approach may be used on other parts of the body. An interactive communication unit 50 may be interconnected to the computational unit 30 which permits the remote transfer of data by radio frequency, optical, acoustic or other known methods. Acoustic sensors may be triggered by audio musical states causing preprogrammed effects and messages stored in the memory of the computational unit 30. Alternatively, the data may be transferred outside the human auditory range.

An affixed photocell may provide reserve power storage (charging of batteries) and/or intensity or operational control based on the ambient light.

This innovation may be applied as shown in FIG. 21 with a central control program station 410, distributed or directional (to a specific group or location—IR spot light) transmitters 420, 422, 424 and multiple independent persons 150 on stage 414 or in the audience 412 with tickets 430, wands 10, tops, frisbees, batons, or other embodiment of the present invention. Venues include concerts, sports events, fairs, parades, amusement parks, celebrations such as July 4, and other events where a innovative visual effect is desired. A further improvement of the present invention includes encoding an individual or group identity in each program or receiver in each ticket 430 or device (wand 10, etc.) which would permit the grouping of devices in a target audience. See FIG. 22. Thus a show designer could cause only the wands held by the balcony audience to light up, or those on stage left 416 to be different than those on stage right 418. Games, messages, images could be coordinated over the audience. A permanent message may be left at the close of the performance.

A coordinated sound or tactile element such as a speaker or vibrator may be included in the improved embodiment of the present invention driven the computer 30 with a message transferred by the communication mechanism.

FIG. 11 shows a preferred construction of a rotational embodiment such as a pinwheel, helicopter, desk spinner, fan or other similar design. In a further improved embodiment, the LED array 12 spins about axis 170 driven by image computer 30 receiving position and direction signals from one or more sensors 44 and triggers 42. A flexible arm 172 may be construction in whole or part from flexible circuit board held by strut 162. Power may be transmitted across split transformer 164, 166 from source 34 which may be batteries or wall power. Communication and programming may be provided by infrared, acoustic or radio waves to sensor 50.

FIG. 12 shows a preferred embodiment of construction using a circuit board material which may be folded at 180 and thereby simplify the construction of a dual sided LED 12 design.

FIG. 13 presents the multiple dimension ring embodiment of the present invention where one or more rings 192, 194 are populated by light emitters 12 and the CPU/power/switch modules 30. The rings may be articulated, rigid or flexible and free to move relative to one another. The attachment points 196 include swivel devices, and may connect to a singular line or multiple lines 198. Shapes other than rings, such as boxes, planes, etc., may be used. Aerodynamic shapes 200 which cause the rings 192, 194 to move in complex motions may be employed. In operation, the revolution about the line 198 may be accompanied by a rotation about the swivels 196 and internal couplings producing a complex pattern of light emitters 12.

FIG. 14 presents a top view of a preferred autostereoscopic embodiment which may be applied at any of the embodiments of the present invention. Autostereoscopy or binocular special effects is produced by the process of binocular disparity—presenting a different image to each eye of the observer. This is accomplished by using an opaque tube 210, which has one or more apertures 212 which may be parallel to the principal axis of the tube, a series of apertures, or other configuration for specialty applications. Internally situated light emitters 12 are controlled by an image computer (not shown). At each point in time, each eye 216 of the observer 214 sees a different set of emitters 12. As the tube 210 traverses a path, it projects multiple unique images to each angular view.

FIG. 15 presents a perspective view of a preferred autostereoscopic embodiment which may be applied at any of the embodiment of the present invention. The autostereoscopic tube 210 is opaque, has a window 212 which may be parallel to the principal axis of the tube, a series of apertures, or other configuration for specialty applications, light emitters 12 distributed internally and control electronics and power supply 30 for the light emitters 12. The method of operation is shown in FIG. 14 where a cross section of the autostereoscopic tube 210 is shown at two tube positions. The each eye 216 of the observer 214 views different emitters 12 shown internal in the tube 210.

FIG. 16 shows a rotational embodiment of the preferred invention where multiple tubes 210 are attached to a rotational hub 220 and rotate about and parallel to the axis of rotation. The operation is similar to the previously discussed rotational embodiments of this invention. On a bicycle implementation the tubes 210 may rotate in the plane of wheel, parallel to the axis of rotation, or some combination thereof.

FIG. 17 shows a top section of a composite shield embodiment of the present invention where multiple tubes 210 are enclosed in a fixed or portable frame (not shown) with a rear surface, opaque or a reflector flat, parabolic, ellipsoid, or complex; and an optional front transparent cover 232. The cover 232 may be on colored or elliptically polarized material to increase the contrast and reduce the reflection of ambient light.

Another preferred embodiment of the present invention discloses a game method designed to enhance hand-eye coordination and provide entertainment. Generally, the embodiment measures the periodicity and frequency of the players wand motion while providing visual feedback.

FIG. 18 shows a two pattern embodiment of a "C" 300 and an "X" 302 whose position is controlled by the image controller 30 based on various game strategies. In one embodiment, when the user operates the wand 10 at the correct frequency for the designated period of time, the "C" will move to superimpose with the "X". In an alternative embodiment, the level of proficiency is controlled by the computational unit 30 based on the user's history. Multiple colors may be used for each pattern. Many other configurations, styles and games are envisioned.

Figure 19:
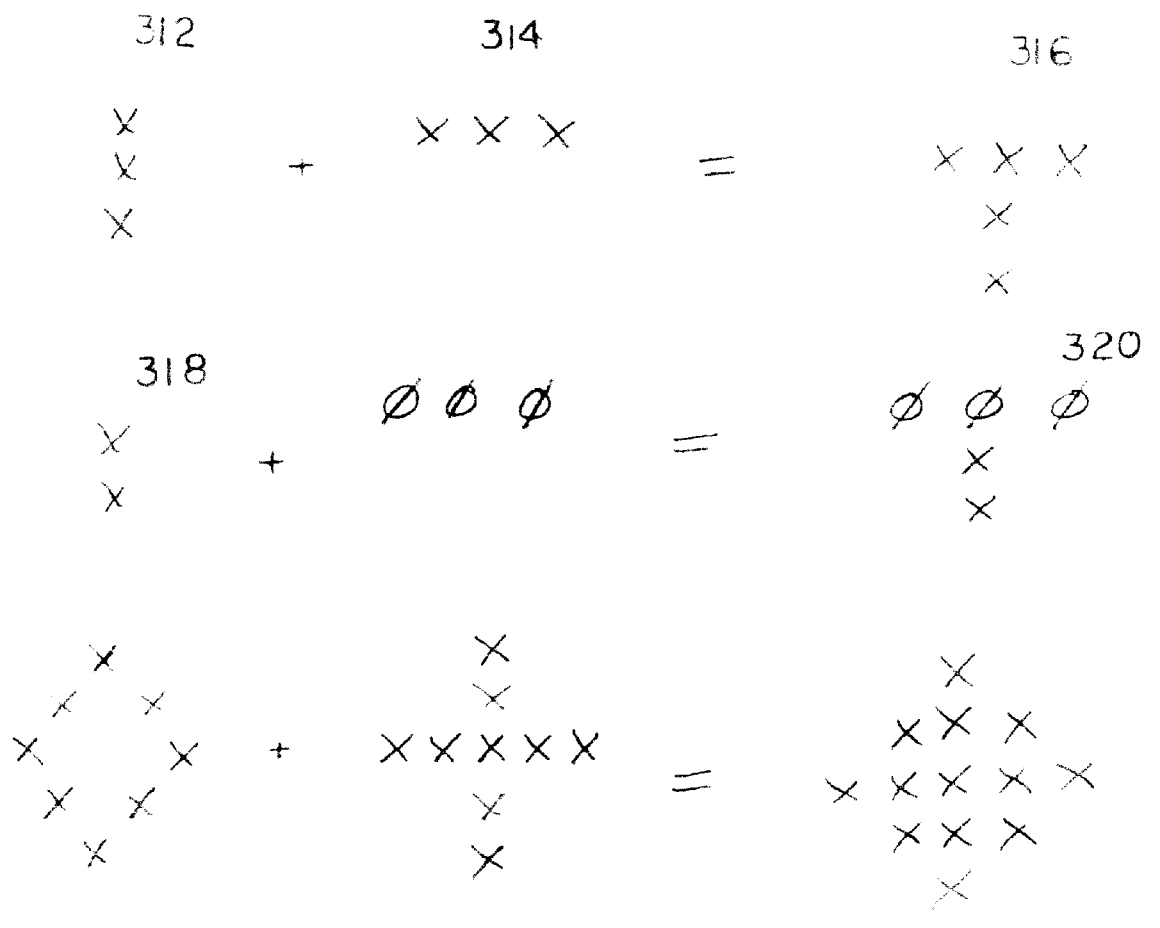

FIG. 19 shows a limited number of alternative patterns where column 312 combines with row 314 to produce a letter T 316. Pattern 318 in red, for example and pattern 320 in green produce a red and yellow T using the color persistence of human vision. This effect may be used to produce some complex images including moving objects in space. For example, 1. at least one patterns, displaying twice per cycle, designed to be superimposed
2. a speed & proficiency control setting (a potentiometer, timer incrementor, etc)
3. a superimposed duration memory and setting to indicate success
4. a method (pattern change, independent lights, to indicate success
5. a on/off indicator having one stationary contact and one moving contact.
6. having at least two colors
7. having an animation—pac man type FIG. 20 shows a two pattern embodiment of a "+" 304 and an "0" 306 whose position is controlled by the image controller 30 based on various game strategies. In one embodiment, when the user operates the wand 10 at the correct frequency for the designated period of time, the "+" will distally move to superimpose with the "0".

FIG. 21 is referenced under FIG. 10.

FIG. 22 shows a front view of the ticket embodiment of the present invention. On or embedded in each ticket 450 (or wand, coaster, bookmark, ruler, etc.) is a data receiver 50, an computer 30, one or more identifiable light emitters 12, an optional speaker or vibrator element 452, or other optional computer controlled device. The program 454 receives the common signal 456 which may be an infrared carrier frequency or other pattern, and tests its identity code. If the code matches, the ticket 450 follows the transmitted program or instructions. Each ticket 454 may be sold with a existing identity code according to seating, may be programmed live according to the seating position, or may be referenced by a lookup table 462 which associates the ticket identity code 464 to the seat location 466. This improvement permits the show designer to develop unique and specific effects which predictably move through and are coordinated throughout the audience, the venue and the stage.

FIG. 23 shows the alternative detailed constructions of the displaceable wand and handle connection as generally shown in FIG. 1.

Other embodiments of the mechanism are envisioned within the embodiments presented. For example, a simplified single spring reed switch of the present invention where general mounting of the single stationary contact is provided perpendicular to the general direction of translocation, a moveable reed contact which may have a local increase in mass, a non-conductive spacer and electronic leads extend to the computational control electronics. In operation, when the display is translocated in direction with sufficient acceleration or deceleration to overcome the resistance of spring reed contact the switch is closed. One advantage of this invention is that the off state of the switch is maintained regardless of orientation or normal vibration.

Summary of Embodiment Combinations

The preferred wand embodiment with acceleration/frequency/velocity/orientation measure On a string
   With 2D–>3D planar structure which rotates from airfoil
On a bicycle
   With a generator
   With a photocell
   Programmable with Names
   On pedals-under the shoe
   With wings-aerodynamically extends-fiber optic tip with gravimeter
With Accelerometer
   Cycle through messages
   Different Messages/Patterns on increase/decrease
   Sword with correct outward messages on left/right swings as a Clock
As an advertising tools
Autostereoscopic tube
   as wand
   as tube (multiple) on platform as TV, clock, message board
   as Tube (multiple) rotating at focus of elliptical mirror/lens
   as Tube (multiple) rotating at focus of parabolic mirror/lens
   as Tube (multiple) rotating at focus of complex mirror/lens A high performance, moving volumetric display method may incorporate all of the enumerated components, which together permit a substantial advance in the current technology. Improvements in the use of image memory, update and refresh rates, computer processor utilization are shown in the method. The display apparatus implements the method providing improvements in the high contract display, utilization of light emitter elements, simplicity of construction, minimization of mechanical components, and reproducible precision for static as well as moving platforms.

All the embodiments may include common toy embellishments such as coordinated sounds, multiple colors and decorative patterns.

The embodiment of the invention particularly disclosed and described herein above is presented merely as an example of the invention. Other embodiments, forms and modifications of the invention coming within the proper scope and spirit of the appended claims will, of course, readily suggest themselves to those skilled in the art.

What I claim is:

1. A handheld, swing display device comprising a plurality of light emitting means mounted on a support member for providing a virtual image of characters or figures through a swing arc;

computer means for controlling said light emitting means;

activation means for initiating or controlling the light emitting means;

and autostereoscopic means for producing a multiplicity of views distinct to each eye of the observer.

2. A handheld, swing display device in accordance with claim 1, further comprising a plurality of autostereoscopic means for producing a multiplicity of views to observers on different sides of the operator.

3. A handheld, swing display device in accordance with claim 1, further comprising a means for rotating said autostereoscopic means about an axis.

4. A handheld, swing display device in accordance with claim 1, further comprising an opaque tube means, an aperture means and a plurality of light emitting means positioned within said tube means.

5. A handheld, swing display device in accordance with claim 3, further comprising one or more autostereoscopic means projected upon an enclosed reflective surface means.

6. A handheld, swing display device in accordance with claim 1, further comprising an activation means having multiple conductive regions affixed to a first member and a conductive region affixed to a second members providing radial position data to said computer means.

7. A handheld, swing display device in accordance with claim 6, further comprising a computer memory means to record a sequence of signals from said activation means.

8. A handheld, swing display device in accordance with claim 6, further comprising a game program means wherein the motion of said device is monitored by said image computer means and the user superimposes successive virtual images created by said device.

9. A handheld, swing display device in accordance with claim 1, further comprising a computer memory means to record a sequence of signals from said activation means.

10. A handheld, swing display device in accordance with claim 1, further comprising a game program means wherein the motion of said device is monitored by said image computer means and the user superimposes successive virtual images created by said device.

11. A handheld, swing display device in accordance with claim 1, further comprising a computer memory means to record a sequence of signals from said activation means.

12. A handheld, swing display device in accordance with claim 1, further comprising a data receiver means for receiving an external signal.

13. A handheld, swing display device in accordance with claim 12, further comprising an identity code means for encoding an identity code.

14. A handheld, swing display device comprising a plurality of light emitting means mounted on a support member for providing a virtual image of characters or figures through a swing arc;

computer means for controlling said light emitting means;

activation means for initiating or controlling the light emitting means having multiple conductive regions affixed to a first member and a conductive region affixed to a second member, such that the deflection of the first member causes the conductive regions to be displaced relatively to the second member to provide radial position data to said computer means.

15. A handheld, swing display device in accordance with claim 14 further comprising a data receiver means for receiving an external signal.

* * * * *